United States Patent
Webb et al.

(10) Patent No.: US 9,200,734 B2
(45) Date of Patent: Dec. 1, 2015

(54) TOOL FOR DEFLECTING SPRAY FROM FLANGE COUPLING

(71) Applicant: Gearench Division of Orbix Corporation, Clifton, TX (US)

(72) Inventors: Andrew Webb, Dayton, TX (US); Pete Webb, Dayton, TX (US)

(73) Assignee: Gearench Division of Orbix Corporation, Clifton, TX (US)

( * ) Notice: Subject to any disclaimer, the term of this patent is extended or adjusted under 35 U.S.C. 154(b) by 326 days.

(21) Appl. No.: 13/648,980

(22) Filed: Oct. 10, 2012

(65) Prior Publication Data

US 2014/0097611 A1     Apr. 10, 2014

(51) Int. Cl.
  *F16L 55/17* (2006.01)
  *F16L 23/00* (2006.01)
  *F16L 23/16* (2006.01)

(52) U.S. Cl.
  CPC .............. *F16L 23/003* (2013.01); *F16L 23/167* (2013.01); *F16L 55/17* (2013.01)

(58) Field of Classification Search
  USPC ........ 285/13, 45, 82, 252, 365, 407, 409, 420
  See application file for complete search history.

(56) References Cited

U.S. PATENT DOCUMENTS 2,421,533 A * 6/1947 Akerman et al. ............. 285/260
2,579,975 A * 12/1951 Scott et al. ............... 292/256.69
2,983,019 A * 5/1961 Rae ................................ 24/438
3,333,302 A * 8/1967 Klima ........................... 24/70 R
3,341,178 A * 9/1967 Cott ............................. 254/258
4,008,937 A * 2/1977 Filippi ......................... 439/192
4,969,923 A * 11/1990 Reeder et al. ................ 285/365
5,470,110 A   11/1995 Hupe
5,586,367 A * 12/1996 Benoit ....................... 24/68 SK
5,851,033 A * 12/1998 Hunt et al. ..................... 285/13
2003/0234539 A1* 12/2003 Antonelli et al. ............ 285/365

FOREIGN PATENT DOCUMENTS

DE        2807893 A1    8/1979
DE       19507736 A1    9/1995
DE       10343952 A1    4/2005

* cited by examiner

*Primary Examiner* — Aaron Dunwoody
*Assistant Examiner* — Fannie Kee
(74) *Attorney, Agent, or Firm* — Bracewell & Giuliani LLP

(57) ABSTRACT

An apparatus for blocking discharge from a flanged pipe coupling, including a strap configured to surround, and cover a gap between flanges. The apparatus includes a tensioning mechanism with a lever pivotally coupled to the strap, a clamp pin mounted on the opposing end of the strap, and an adjustment pin on a side of the clamp pin opposite the lever. Holes extend through ends of the clamp and adjustment pins. The tensioning mechanism includes a bolt having ends, and a mid-portion looped around the lever, so that portions of the bolt on opposing ends of the mid-portion are generally parallel and project through the holes. A fastener is mounted onto each bolt end on a side of the adjustment pin opposite the clamp pin. When the lever pivots away from the clamp pin, contact between the lever and bolt urges the ends of the strap together, increasing tension therein.

11 Claims, 4 Drawing Sheets

TOOL FOR DEFLECTING SPRAY FROM FLANGE COUPLING

BACKGROUND OF THE INVENTION

1. Field of the Invention

This technology relates to pipe couplings. In particular, this technology relates to tools for deflecting spray from between flanges of flanged pipe couplings.

2. Brief Description of Related Art

Occasionally, when disconnecting the bolts from the flanges of a pipe coupling, some liquid may spray out of the coupling, even though the flow line may have been relieved of pressure. Such spray may be hazardous to workers, and also to the environment. For example, the fluid that sprays out of the coupling may be oil, or a dangerous chemical. If such fluid sprays onto a worker, it may injure the worker. In addition, if such oil or chemical sprays to a shop environment, it may cause undesirable conditions, such as slip and fall hazards in the vicinity of the spray. Furthermore, if such oil or chemical sprays into the natural environment, it may pollute, or otherwise contaminate the environment.

Shields for use in blocking spray from pipe couplings are known in the art. For example, the device of U.S. Pat. No. 5,470,110 is a shield for blocking spray from a worker to protect the worker. The shield provides a flexible band that a blocks spray around a portion of the flanges of a pipe coupling. The purpose of the shield is to protect the particular worker loosening bolts on the flanges, while still allowing the spray to exit the coupling away from the worker. While such a shield may serve the limited purpose of protecting the worker standing directly behind the shield, it has many shortcomings. For example, in situations where a second worker is nearby, the shield would not necessarily protect the second worker. In addition, because the shield still allows the spray to exit the coupling, albeit in a direction away from the worker, the spray may still harm the environment.

SUMMARY OF THE INVENTION

Disclosed herein is a spray deflector for blocking discharge from a flanged pipe coupling having a pair of flanges positioned adjacent one another and separated by a gap. The spray deflector has a strap with first and second ends that is configured to circumferentially surround the flanges and cover the gap. The spray deflector also has a tensioning mechanism for increasing or decreasing the tension in the strap around the flanges.

The tensioning mechanism of the spray deflector includes a lever having an end pivotally coupled to the first end of the strap. It also has a clamp pin mounted on the second end of the strap, and an adjustment pin on a side of the clamp pin opposite the first end of the strap. Holes extend through ends of the clamp pin and adjustment pin, and extend generally along a length of the strap, In addition, the tensioning mechanism includes a U-shaped bolt having threaded ends, and a curved mid-portion looped around the lever, so that portions of the bolt on opposing ends of the curved mid-portion are generally parallel and project through the holes of the clamp pin and the adjustment pin. A threaded fastener may be mounted onto each threaded end of the U-shaped bolt on a side of the adjustment pin opposite the clamp pin, so that when the lever pivots in a direction away from the second end, contact between the lever and bolt urges the second end of the strap towards the first end, and transfers a tension force into the strap. The spray deflector is configured so that adjusting the positions of the threaded fasteners on the threaded ends of the I-shaped bolt selectively adjusts the magnitude of the tension force.

Also disclosed herein is a method of deflecting spray while disconnecting fasteners of a flanged pipe coupling having a pair of flanges. According to the method, a spray deflector as described herein is positioned with its strap over a gap between the flanges of the flanged pipe coupling so that strap substantially covers the gap around the circumference of the flanges. Tension in the strap is then increased so that the strap blocks spray from exiting the flanged pipe coupling via the gap.

BRIEF DESCRIPTION OF THE DRAWINGS

The present technology will be better understood on reading the following detailed description of nonlimiting embodiments thereof, and on examining the accompanying drawings, in which.

DETAILED DESCRIPTION OF THE PREFERRED EMBODIMENT

Figure 1:
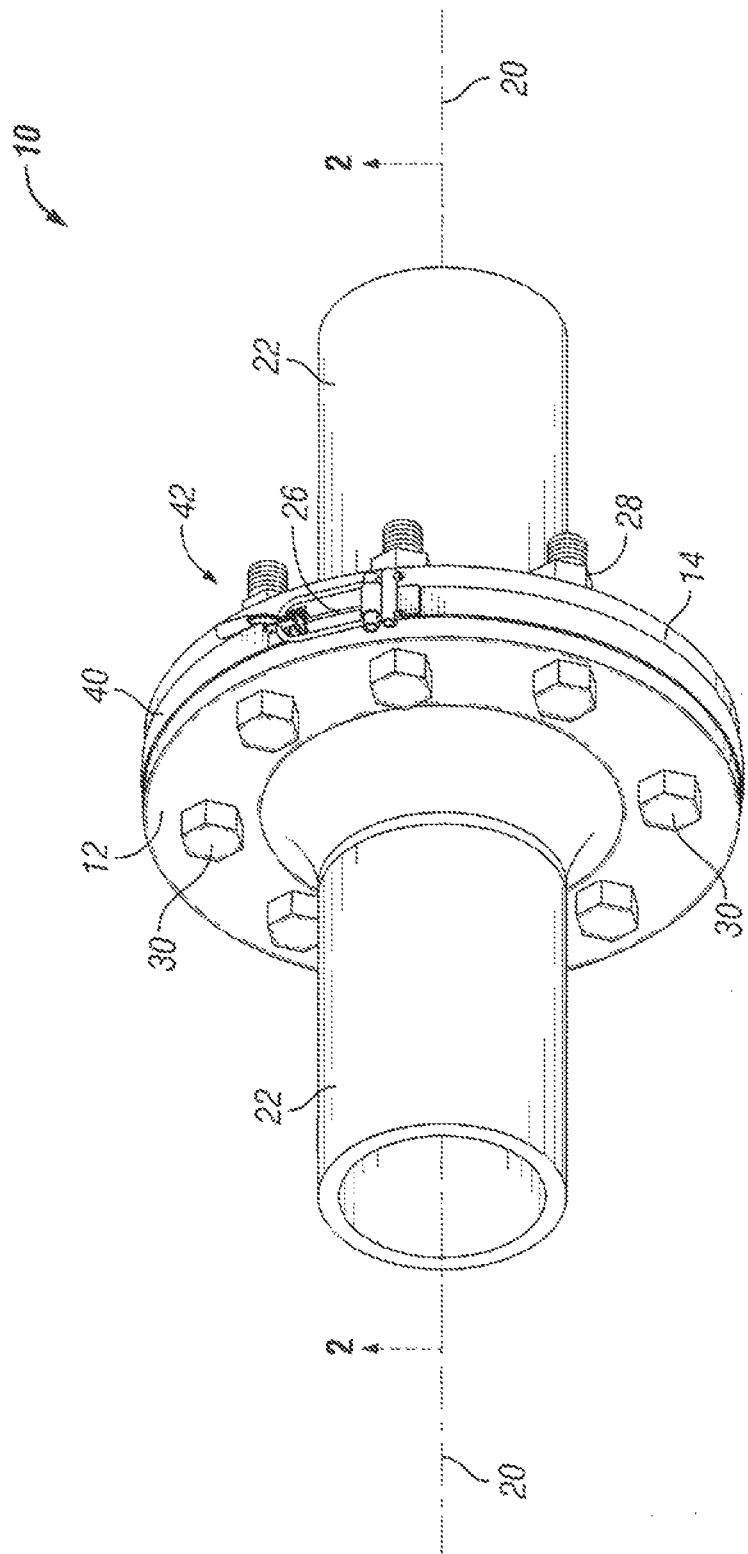
FIG. 1 is a perspective view of a flanged pipe coupling and a spray deflector according to an embodiment of the present technology.

The foregoing aspects, features, and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. However, the technology is not intended to be limited to the specific terms used, and it is to be understood that each specific term includes equivalents that operate in a similar manner to accomplish a similar purpose.

Figure 2:
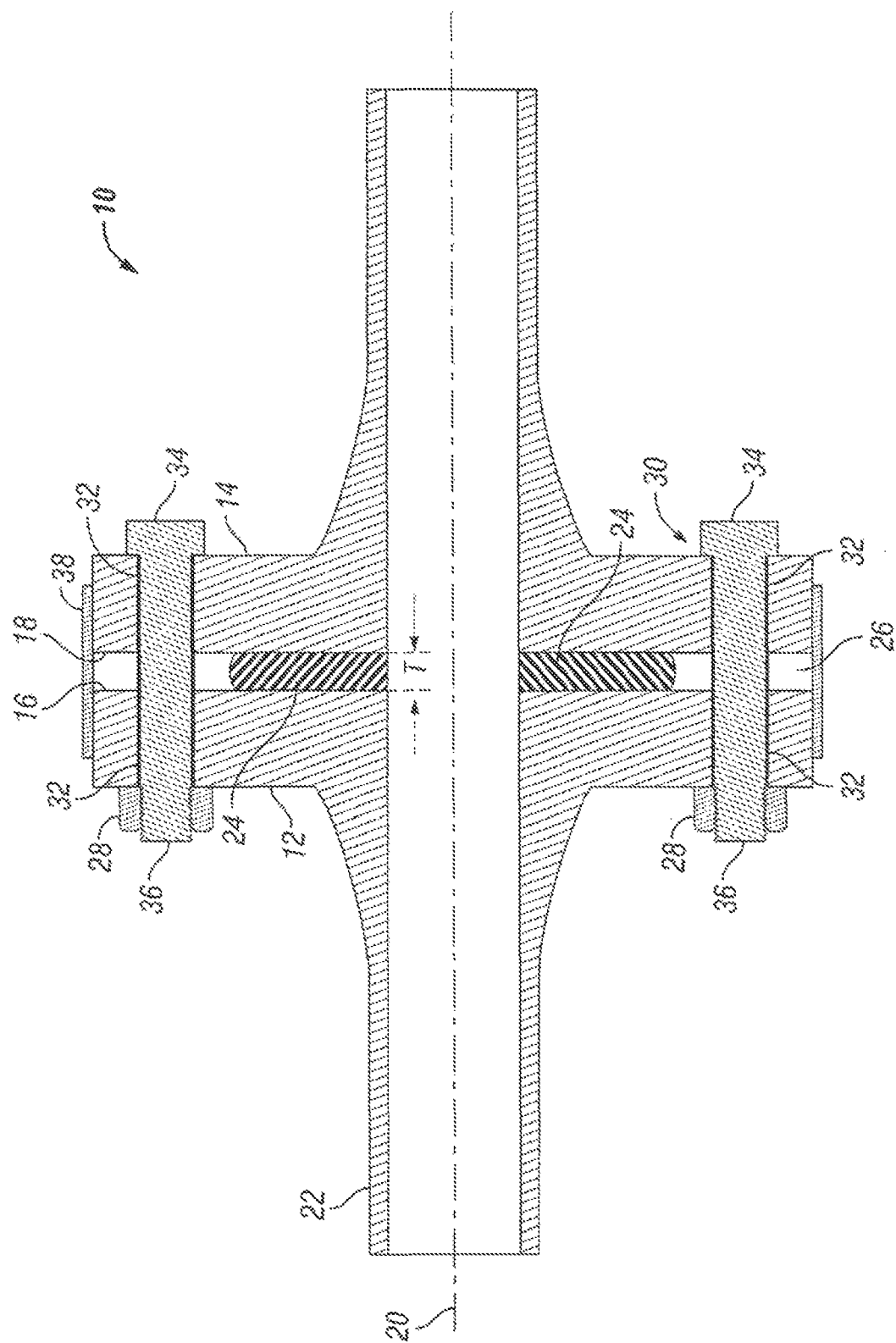
FIG. 2 is a side cross-sectional view of the flanged pipe coupling taken along line 2-2 of FIG. 1

FIG. 1 is a perspective view of a flanged pipe coupling 10 according to an embodiment of the present technology, and FIG. 2 is a cross sectional side view of the flanged pipe coupling 10 taken along line 2-2 of FIG. 1. As best shown in FIG. 2, the flanged pipe coupling 10 includes flanges 12, 14 having flange faces 16, 18. Flange faces 16, 18 are oriented in a plane normal to the longitudinal axis 20 of a pipe 22 which carries the flanges 12, 14. The flanges 12, 14 are generally configured so that the flange faces 16, 18 are adjacent to one another upon assembly of the flanged pipe coupling 10. Optionally, a seal 24 may be inserted between the flange faces 16, 18 to seal the interface between the flange faces 16, 18. The seal 24 may have a thickness T so that when the flanges 12, 14 are aligned with the seal 24 between them, the flanges 12, 14 are not able to come directly into contact with one another. Thus configured, the flanged pipe coupling 10 includes a gap 26 between the flanges 12, 14.

In certain embodiments, the flanges 12, 14 are secured relative to one another with fasteners, which may be nuts 28 and bolts 30. In such embodiments, assembly of the flanged pipe coupling 10 includes aligning the flanges 12, 14 so that holes 32 in the flanges 12, 14 are aligned, and inserting the bolts 30 through the holes. Each bolt 30 may be inserted into its corresponding hole 32 until the bolt head 34, which has a diameter greater than the diameter of the hole 32, comes into contact with an outer surface of the flange 14. Thus inserted, each bolt 30 is long enough that it extends through the holes 32 in flanges 12, 14, and the threaded end 36 of each bolt 30 extends beyond the outer surface of flange 14. A threaded nut 28 is threaded onto the threaded end 36 of each bolt 30 and tightened, thereby pulling the flanges 12, 14 toward one another, and compressing the seal 24 therebetween. When compressed in this way, the seal 24 creates a fluid tight seal that prevents fluid inside the pipes 22 from leaking through the coupling 10. Depending on pressure requirements of the flanged pipe coupling 10, any number of bolts may be used to fasten the flanges 12, 14. Typically, the bolts 30 are substantially evenly spaced around the flanges 12, 14.

To disassemble the flanged pipe coupling 10, the bolts 30 are unfastened from nuts 28 so the flanges 12, 14 can be separated. Sometimes, as the bolts 30 are unfastened, some liquid from within the pipes 22 and the coupling 10 may spray out of the coupling 10. This may be due to residual pressure in the pipes 22 and the coupling 10, or for other reasons. Such spray is undesirable because it may be hazardous to the worker performing the disassembly, or to other nearby workers. In addition, such spray may be undesirable because, depending on the nature of the sprayed fluid, it may be harmful to the environment around the coupling 10, or its presence in the work environment outside the coupling 10 may create a hazardous work environment.

Figure 3:
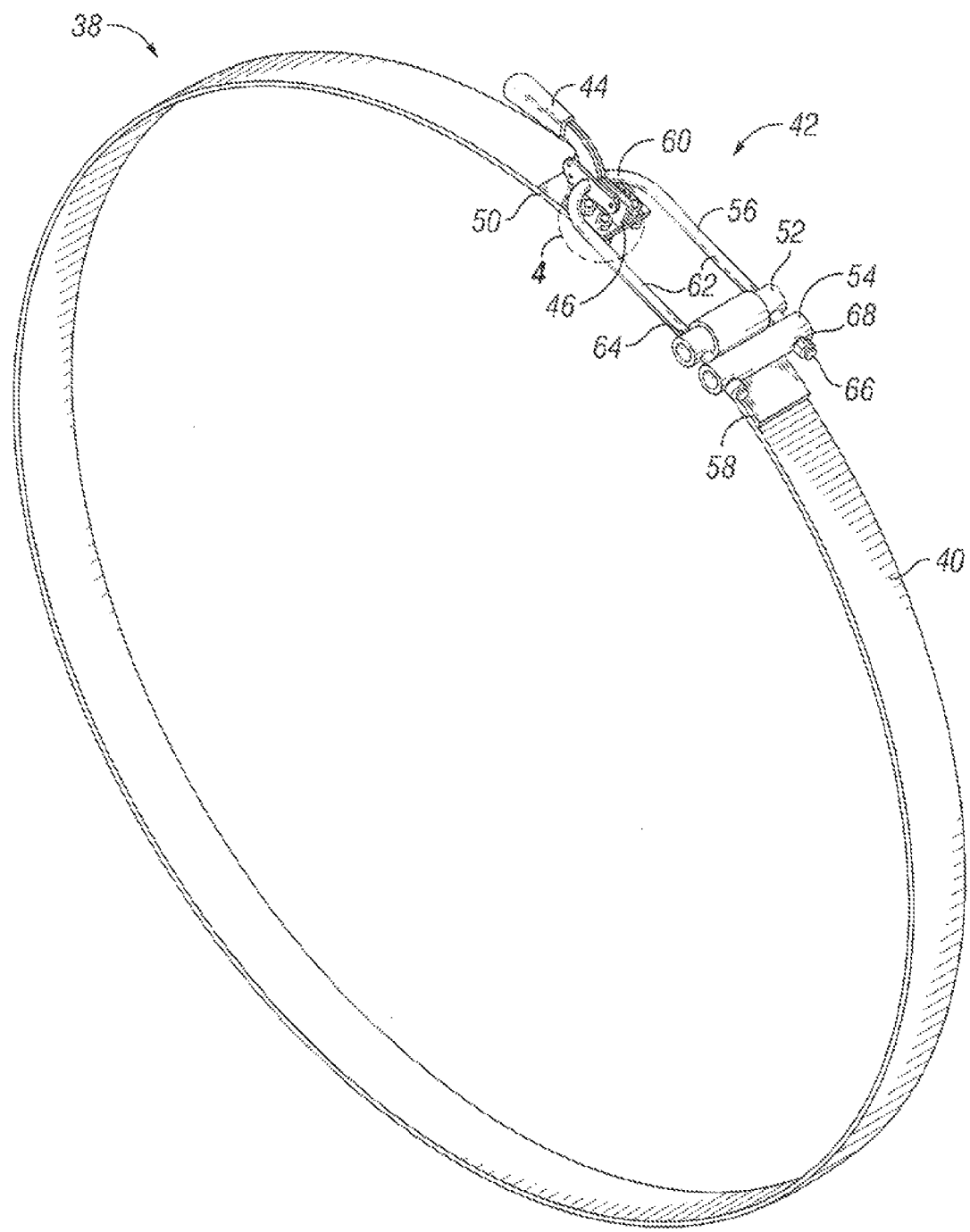
FIG. 3 is a perspective view of the spray deflector according to one embodiment of the present technology.

In order to limit this spray upon disassembly of the coupling, and as best shown in FIGS. 1 and 3, a spray deflector 38 may surround the flanges 12, 14 of the coupling 10, and cover the gap 26 therebetween. As shown, the spray deflector 38 may include an elongate strap 40, wide enough to span the gap 26, and long enough to substantially surround the flanges 12, 14. When positioned over the gap 26, the spray deflector 38 will block spray that may exit the coupling 10 when the nuts 28 and bolts 30 are loosened.

Figure 4:
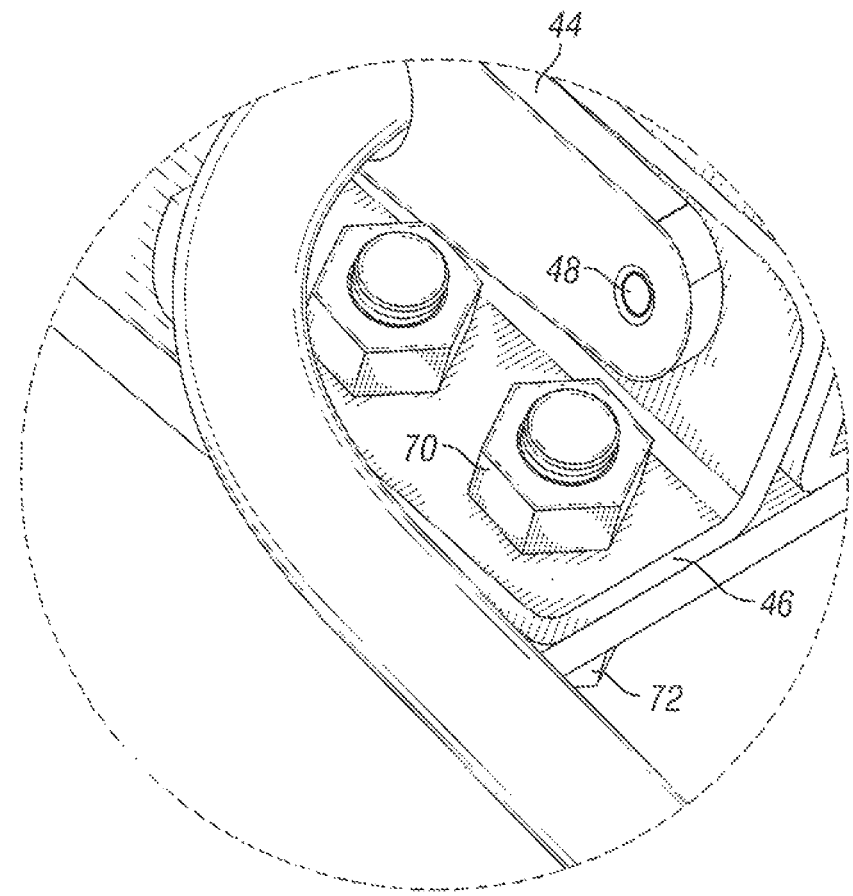
FIG. 4 is an enlarged view of a portion of the spray deflector as indicated by area 4 of FIG. 3.

Referring to FIG. 3, the spray deflector 38 also includes a tensioning mechanism 42 configured to increase or decrease the tension in the strap 40 around the circumference of the flanges 12, 14. The tensioning mechanism 42 may include a pivoting tensioning lever 44 that is pivotally attached to a base 46. As shown in FIG. 4, the tensioning lever 44 may be attached to the base 46 with a pin 48. The pin 48 restricts axial and radial movement between the tensioning lever 44 and the base 46, but allows circumferential rotation of the tensioning lever 44 relative to the base 46. The base 46 is attached to, or formed integrally with, a first end 50 of the strap 40. In some embodiments, the base 46 may be attached to the first end of the strap 50 using nuts 70 and bolts 72.

Referring back to FIG. 3, the tensioning mechanism 42 may also include a clamp pin 52, an adjustment pin 54, and a tensioning bolt 56. The clamp pin 52 may be configured for attachment to a second end 58 of the strap 40. For example, in some embodiments, the second end 58 of the strap 40 may surround the clamp pin 52 and attach to itself, as shown in FIG. 3. The tensioning bolt 56 may have a U-shape, including a curved portion 60 and legs 62. The tensioning bolt 56 may be configured so that the legs 62 pass through holes 64 in the clamp pin 52, and the curved portion 60 is rotatably engaged with the tensioning lever 44 at a position forward of the pin 48. The legs 62 have a smaller diameter than the holes 64 in clamp pin 52 so that the legs 62 can freely slide axially relative to the holes 64.

The portion of the legs 62 opposite the clamp pin 52 from the tensioning lever 44 may be configured to engage the adjustment pin 54. In the embodiment shown in FIG. 3, the legs 62 have threaded ends 66 and pass through the adjustment pin 54. A nut 68 threadedly engages each of the legs 62 to prevent the adjustment pin 54 from sliding off the legs 62 and disengaging from the tensioning bolt 56. In the embodiment shown in FIGS. 1 and 3, the spray deflector is configured so that when in place on the flanges 12, 14, the strap 40 of the spray deflector 38 may substantially surround the whole circumference of the flanges 12, 14, excepting only where the tensioning bolt 56 of the tensioning mechanism 42 bridges the gap between the first and second ends 50, 58 of the strap 40. Because the strap 40 substantially surrounds the whole circumference of the flanges 12, 14, the spray is restrained from reaching any workers in the vicinity of the coupling 10, or the environment.

When configured as described herein, and shown in FIGS. 1 and 3, the tensioning mechanism 44 is capable of increasing or decreasing the tension in the spray deflector 38 around the flanges 12, 14. For example, when the tensioning lever 44 is in an up position (not shown), the curved portion 60 of the tensioning bolt is positioned upward and away from the first end 50 of the strap 40. Conversely, when the tensioning lever 44 is in the down position of FIG. 3, the curved portion 60 of the tensioning bolt is positioned downward and close to the first end 50 of the strap 40 from contact with the lever 44. Thus, as the tensioning lever 44 pivots from an upward to a downward position and back, the curved portion 60 of the tensioning bolt 56 is respectively moved toward and away from the first end 50 of the strap 40.

As the U-shaped portion 60 of the tensioning bolt 56 moves toward and away from the first end 50 of the strap 40, the legs 62 of the tensioning bolt 56 likewise move toward and away from the first end 50 of the strap 40. As the legs 62 move toward the first end 50, they pull the adjustment pin 54 into the clamp pin 52, and then pull both the adjustment pin 54 and the clamp pin 52 toward the first end 50. Because the second end 58 is attached to the claim pin 52, the second end 58 is also pulled toward the first end 50 and the tension in the strap 40 is increased around the flanges 12, 14. Similarly, as the legs move away from the first end 50, the adjustment pin 54 also moves away from the first end 50, and tension on the second end 58 of the strap 40 decreases. The tension applied to the strap 40 can be further adjusted by adjusting the position of the nuts 68 on the legs 62, which in turn adjusts the position of the adjustment pin 54 toward or away from the first end 50 of the strap 40.

The ability to increase or decrease the tension in the strap 40 of the spray deflector 38 is advantageous because different tensions are needed during different phases of use of the spray deflector 38. For example, a decreased tension is desirable during installation of the spray deflector 38 because the deflector 38 moves into place over the gap 26 between the flanges 12, 14. However, an increased tension is desirable while disconnecting the bolts of the flange during adjustment, maintenance, or disassembly, to better contain spray.

An alternate embodiment of the present technology includes a method of using the spray deflector 38. The method includes positioning the spray deflector 38 over the gap 26 between two flanges 12, 14 of a flanged pipe coupling 10 so that the strap 40 of the spray deflector substantially surrounds the circumference of the flanges 12, 14. The method further includes increasing the tension of the strap 40 by moving the tensioning lever 44 of the tensioning mechanism 42 from an upward position to a downward position, as described above, so that the spray deflector 38 blocks spray from exiting the flanged pipe coupling 10 via the gap 26. In some embodiments, the method may further include decreasing the tension of the strap 40 by moving the tensioning lever 44 of the tensioning mechanism 42 from a downward to an upward position so that the spray deflector is movable relative to the flanges for repositioning or removal of the spray deflector.

While the technology has been shown or described in only some of its forms, it should be apparent to those skilled in the art that it is not so limited, but is susceptible to various changes without departing from the scope of the technology. Furthermore, it is to be understood that the above disclosed embodiments are merely illustrative of the principles and applications of the present technology. Accordingly, numerous modifications may be made to the illustrative embodiments and other arrangements may be devised without departing from the spirit and scope of the present technology as defined by the appended claims.

What is claimed is:

1. An apparatus for blocking discharge from a flanged pipe coupling having a pair of flanges positioned adjacent one another, the pair of flanges at least partially separated by a gap, the apparatus comprising:
    a strap having a first end and a second end, and configured to substantially circumferentially surround the flanges and cover the gap; and
    a tensioning mechanism comprising:
        a lever having an end pivotally coupled to the first end;
        a clamp pin mounted on the second end;
        and an adjustment pin mounted on the second end and on a side of the clamp pin opposite the first end;
        holes extending through ends of the clamp pin and adjustment pin that extend generally parallel to the strap;
        a U-shaped bolt having threaded ends, and a curved mid-portion looped around the lever, so that portions of the bolt on opposing ends of the curved mid-portion are generally parallel and project through the holes; and
        a threaded fastener mounted onto each threaded end on a side of the adjustment pin opposite the clamp pin, so that when the lever pivots in a direction away from the second end, contact between the lever and bolt urges the second end towards the first end and transfers a tension force into the strap.

2. The apparatus of claim 1, wherein the holes retain the bolt in a plane that is substantially tangential to an outer circumference of the strap.

3. The apparatus of claim 1, further comprising a profile on the lever in which the portion of the bolt contacting the lever is received.

4. The apparatus of claim 1, wherein the clamp pin and the adjustment pin are each generally cylindrical members and oriented so their respective ends project past lateral edges of the strap.

5. The apparatus of claim 4, wherein at least a portion of each hole is past at least one of the lateral edges of the strap.

6. An apparatus for blocking discharge from a flanged pipe coupling having a pair of flanges positioned adjacent one another, the pair of flanges at least partially separated by a gap, the apparatus comprising:
    a strap having a first end and a second end, and configured to substantially circumferentially surround the flanges and cover the gap; and
    a tensioning mechanism comprising:
        a lever having an end pivotally coupled to the first end;
        a clamp pin mounted on the second end;
        and an adjustment pin mounted on the second end and on a side of the clamp pin opposite the first end;
        holes extending through ends of the clamp pin and adjustment pin that extend generally parallel to the strap;
        a U-shaped bolt having threaded ends, and a curved mid-portion looped around the lever, so that portions of the bolt on opposing ends of the curved mid-portion are generally parallel and project through the holes; and
        a threaded fastener mounted at a position onto each threaded end on a side of the adjustment pin opposite the clamp pin, so that when the lever pivots in a direction away from the second end, contact between the lever and bolt urges the second end towards the first end and transfers a tension force into the strap;
        wherein adjusting the position of the threaded fastener on each of the threaded ends selectively adjusts a magnitude of the tension force.

7. The apparatus of claim 6, further comprising a profile on the lever in which the portion of the bolt contacting the lever is received.

8. The apparatus of claim 7, wherein the profile is between a mid-portion of the lever and where the lever attaches to the strap.

9. The apparatus of claim 6, wherein the holes retain the bolt in a plane that is substantially tangential to an outer circumference of the strap, the clamp pin and the adjustment pin are each generally cylindrical members and oriented so their respective ends project past lateral edges of the strap, and at least a portion of each hole is past at least one of the lateral edges of the strap.

10. A method of deflecting spray while disconnecting fasteners of a flanged pipe coupling having a pair of flanges each having a circumference, the method comprising:
    positioning a spray deflector having a strap over a gap between the flanges of the flanged pipe coupling so that the strap substantially covers the gap around the circumferences of the flanges;
    providing a tensioning mechanism comprising:
        a lever having an end pivotally coupled to a first end of the strap;
        a clamp pin mounted on a second end of the strap;
        and an adjustment pin mounted on the second end and on a side of the clamp pin opposite the first end;
        holes extending through ends of the clamp pin and adjustment pin that extend generally parallel to the strap;
        a U-shaped bolt having threaded ends, and a curved mid-portion looped around the lever, so that portions of the bolt on opposing ends of the curved mid-portion are generally parallel and project through the holes; and
        a threaded fastener mounted onto each threaded end on a side of the adjustment pin opposite the clamp pin, so that when the lever pivots in a direction away from the second end, contact between the lever and bolt urges the second end towards the first end and transfers a tension force into the strap;
    and
    increasing tension in the strap using the tensioning mechanism, so that the strap blocks spray from exiting the flanged pipe coupling via the gap.

11. The method of claim 10, further comprising the step of:
    decreasing the tension in the strap so that the spray deflector is movable relative to the flanges for repositioning or removal of the spray deflector.

* * * * *